(12) United States Patent
Lee et al.

(10) Patent No.: US 11,470,933 B2
(45) Date of Patent: Oct. 18, 2022

(54) ACCESSORY FOR FOLDABLE ELECTRONIC DEVICE AND FOLDABLE ELECTRONIC DEVICE INCLUDING THE SAME

(71) Applicant: Samsung Electronics Co., Ltd., Gyeonggi-do (KR)

(72) Inventors: Dahyun Lee, Gyeonggi-do (KR); Kangmoon Kim, Gyeonggi-do (KR); Wonkyu Sung, Gyeonggi-do (KR); Junho Jin, Gyeonggi-do (KR); Sojung Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 205 days.

(21) Appl. No.: 16/736,470

(22) Filed: Jan. 7, 2020

(65) Prior Publication Data
US 2020/0281337 A1    Sep. 10, 2020

(30) Foreign Application Priority Data

Jan. 8, 2019 (KR) ........................ 10-2019-0002125

(51) Int. Cl.
*A45C 11/00* (2006.01)
*A45C 13/00* (2006.01)
*H05K 5/00* (2006.01)

(52) U.S. Cl.
CPC ............ *A45C 11/00* (2013.01); *A45C 13/005* (2013.01); *H05K 5/0017* (2013.01); *A45C 2011/002* (2013.01)

(58) Field of Classification Search
None
See application file for complete search history.

(56) References Cited

U.S. PATENT DOCUMENTS

| 7,916,473 B2 * | 3/2011 | Jang ...................... G06F 1/1656 361/679.55 |
| 8,151,982 B2 * | 4/2012 | Still ...................... A45C 11/00 206/45.23 |

(Continued)

FOREIGN PATENT DOCUMENTS

| CN | 102548279 | 7/2012 |
| CN | 102640074 | 8/2012 |

(Continued)

OTHER PUBLICATIONS

International Search Report dated Apr. 14, 2020 issued in counterpart application No. PCT/KR2020/000311, 3 pages.

(Continued)

*Primary Examiner* — Xanthia C Cunningham
(74) *Attorney, Agent, or Firm* — The Farrell Law Firm, P.C.

(57) ABSTRACT

Provided is a foldable electronic device accessory including a first housing having one surface to which a first body of a foldable electronic device is coupled, a second housing having one surface to which a second body foldably connected to the first body about an axis is coupled, a slide portion having one surface disposed to face the other surface of the second housing and configured to reciprocate toward the axis on the other surface of the second housing, and a first cover configured to enclose the other surface of the first housing, the other surface of the second housing, and the other surface of the slide portion, wherein the one surface of the first housing and the one surface of the second housing face each other in a folded state, and wherein the other surface of the first housing and the other surface of the second housing do not face each other and form a plane in an unfolded state.

20 Claims, 13 Drawing Sheets

(56) References Cited

U.S. PATENT DOCUMENTS

| | | | |
|---|---|---|---|
| 8,230,992 B2* | 7/2012 | Law | G06F 1/1626 |
| | | | 206/320 |
| 8,462,489 B2 | 6/2013 | Kim et al. | |
| 8,905,232 B2* | 12/2014 | Hsieh | G06F 1/1624 |
| | | | 206/320 |
| 9,250,733 B2* | 2/2016 | Lee | H04M 1/022 |
| 9,883,015 B2* | 1/2018 | Michino | G06F 1/1681 |
| 9,930,944 B2 | 4/2018 | Kang | |
| 9,983,620 B1* | 5/2018 | Morrison | G06F 1/181 |
| 10,064,298 B2* | 8/2018 | Cavenagh | H05K 5/0226 |
| 10,121,989 B2 | 11/2018 | Park | |
| 10,754,377 B2* | 8/2020 | Siddiqui | H04M 1/0216 |
| 2012/0111755 A1 | 5/2012 | Harata et al. | |
| 2012/0154288 A1* | 6/2012 | Walker | G06F 1/1681 |
| | | | 345/169 |
| 2012/0236484 A1 | 9/2012 | Miyake | |
| 2012/0314399 A1 | 12/2012 | Bohn et al. | |
| 2015/0233162 A1 | 8/2015 | Lee et al. | |
| 2017/0222179 A1 | 8/2017 | Park | |
| 2018/0139857 A1* | 5/2018 | Cavenagh | G06F 1/1686 |
| 2018/0196468 A1 | 7/2018 | Watamura et al. | |
| 2018/0213902 A1* | 8/2018 | Lim | H04B 1/3888 |
| 2018/0292860 A1* | 10/2018 | Siddiqui | G06F 1/1618 |
| 2018/0324964 A1 | 11/2018 | Yoo et al. | |
| 2019/0027703 A1 | 1/2019 | Ahn et al. | |
| 2019/0237714 A1 | 8/2019 | Seo et al. | |

FOREIGN PATENT DOCUMENTS

| | | |
|---|---|---|
| CN | 106328007 | 1/2017 |
| WO | WO 2012/170593 | 12/2012 |
| WO | WO 2018/066834 | 4/2018 |

OTHER PUBLICATIONS

Chinese Office Action dated Apr. 1, 2022 issued in counterpart application No. 202080008430.1, 30 pages.

* cited by examiner

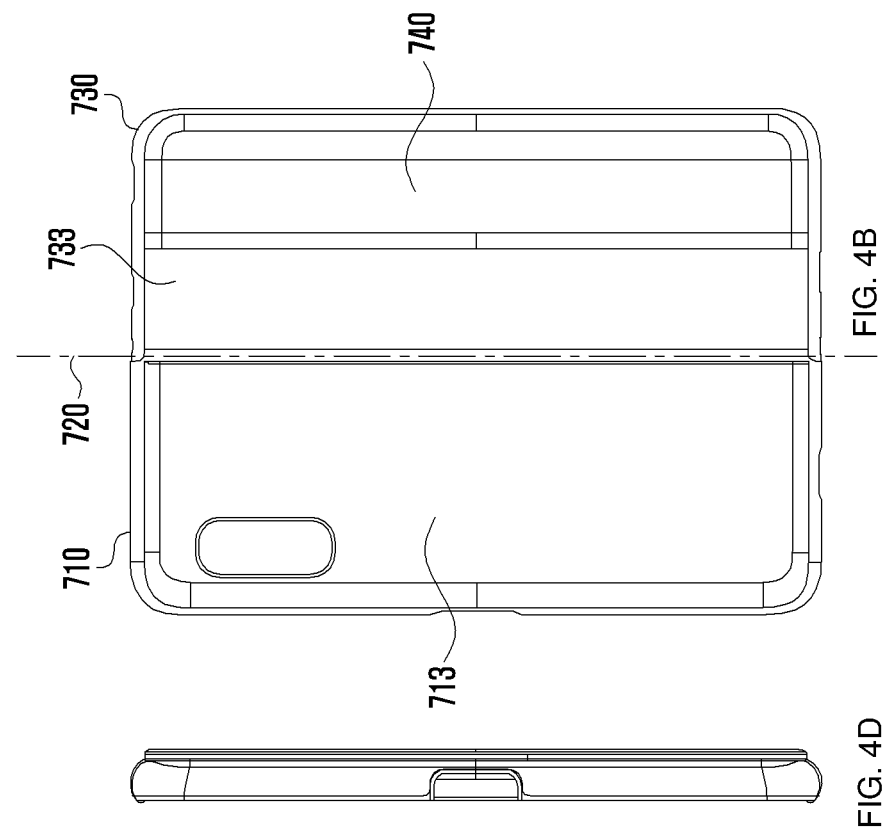
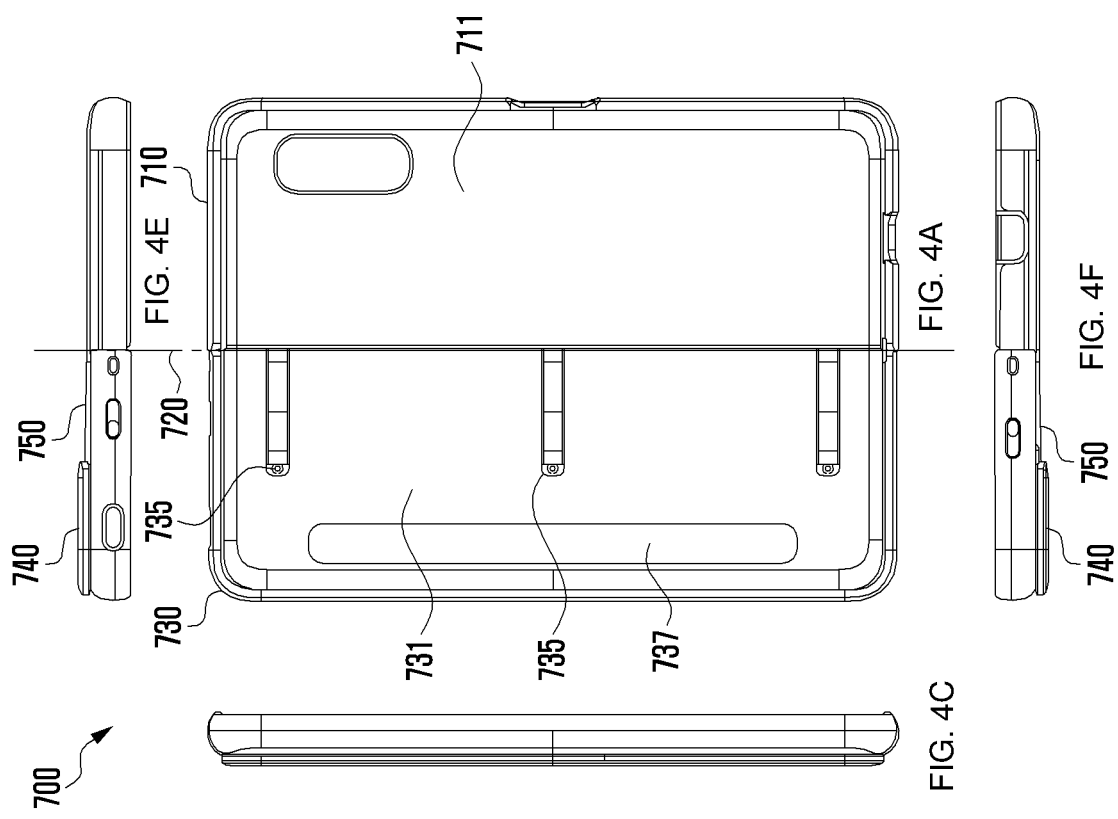

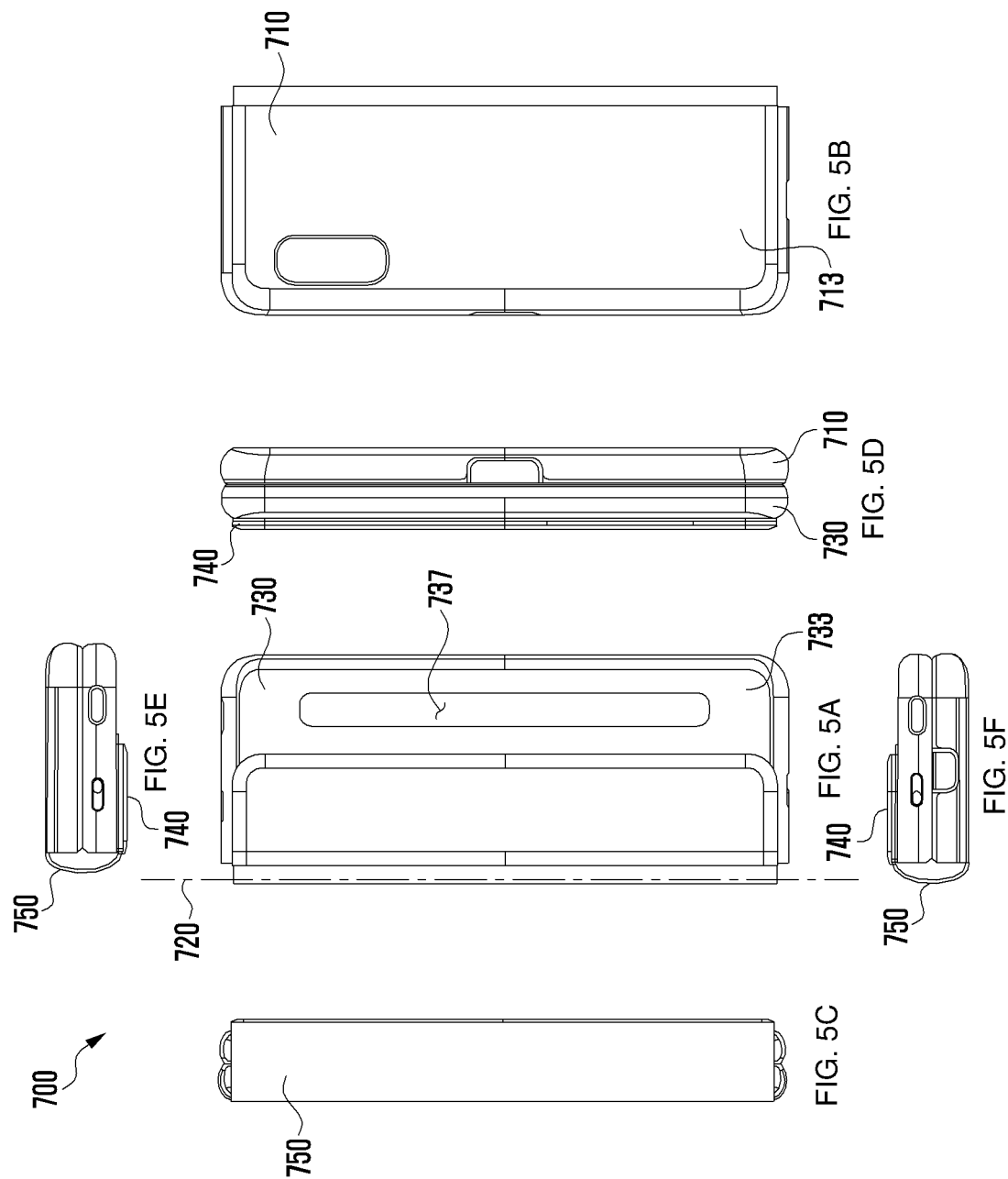

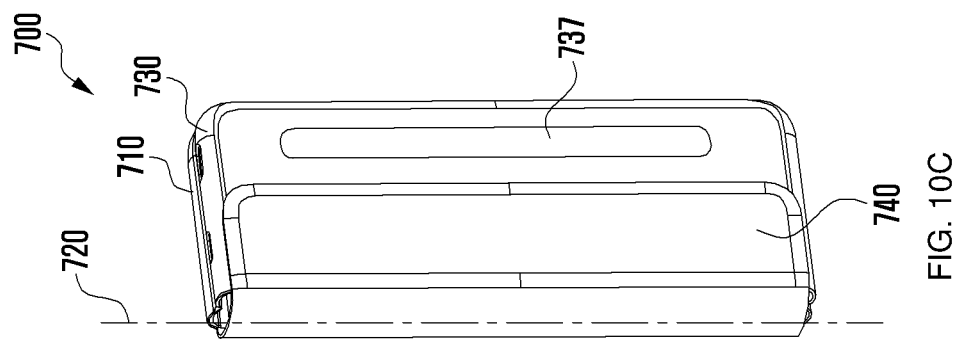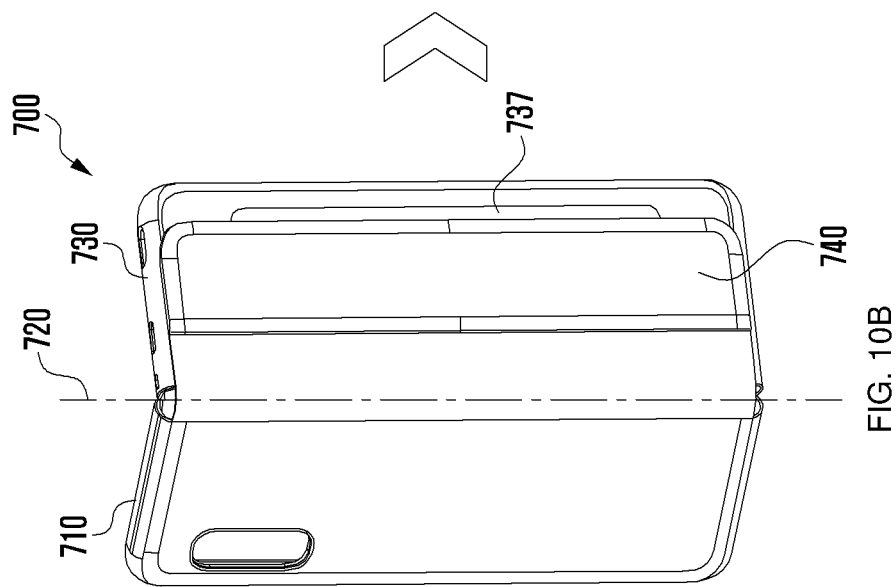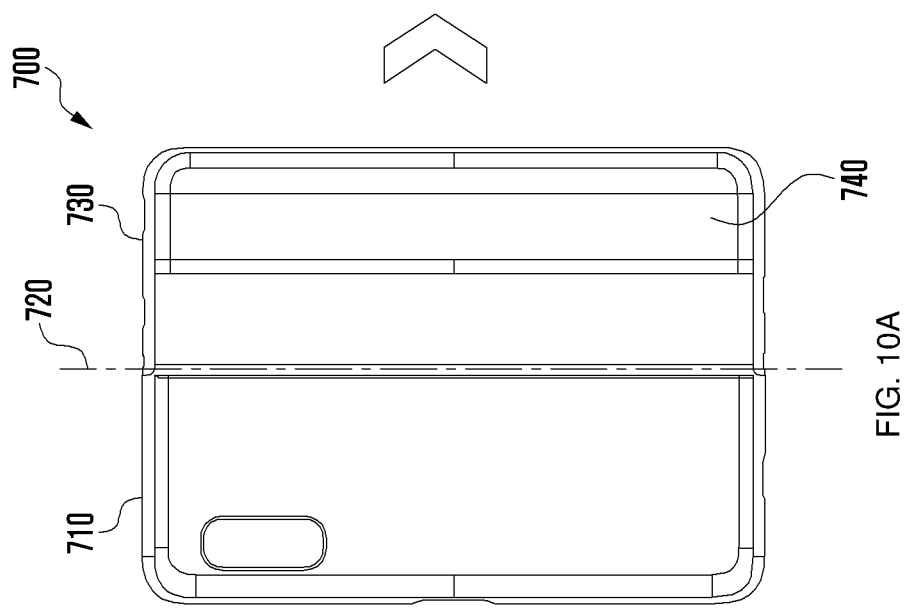

ACCESSORY FOR FOLDABLE ELECTRONIC DEVICE AND FOLDABLE ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2019-0002125, filed on Jan. 8, 2019, in the Korean Intellectual Property Office, the disclosure of which is herein incorporated by reference in its entirety.

BACKGROUND

1. Field

The disclosure relates generally to an electronic device, and more particularly, to a foldable electronic device accessory that can protect a foldable type electronic device.

2. Description of Related Art

Electronic devices may perform various basic or complex functions and have evolved into various shapes in order to provide more convenience to users. With the commercialization of a flexible display and the emergence of a foldable electronic device, however, there is a need in the art for a cover accessory to protect the foldable electronic device.

SUMMARY

In accordance with an aspect of the disclosure, a foldable electronic device accessory includes a first housing having one surface to which a first body of a foldable electronic device is coupled, a second housing having one surface to which a second body foldably connected to the first body about an axis is coupled, a slide portion having one surface disposed to face the other surface of the second housing and configured to reciprocate toward the axis on the other surface of the second housing, and a first cover configured to enclose the other surface of the first housing, the other surface of the second housing, and the other surface of the slide portion, wherein the one surface of the first housing and the one surface of the second housing face each other in a folded state, and wherein the other surface of the first housing and the other surface of the second housing do not face each other and form a plane in an unfolded state a first housing having a surface to which a first body of a foldable electronic device is coupled, a second housing having a surface to which a second body foldably connected to the first body about an axis is coupled, a slide portion having a surface disposed to face the surface of the second housing and configured to reciprocate in a direction of the axis on the surface of the second housing, and a first cover configured to enclose the surface of the first housing, the surface of the second housing, and the surface of the slide portion, wherein the surface of the first housing and the surface of the second housing face each other in a folded state, and wherein the surface of the first housing and the surface of the second housing do not face each other and form a plane in an unfolded state.

In accordance with another aspect of the disclosure, a foldable electronic device includes a first body, a second body foldably connected to the first body about an axis, a flexible display disposed over the first body and the second body, a first housing having one surface to which the first body is coupled, a second housing having one surface to which the second body is coupled, a slide portion having one surface disposed to face the other surface of the second housing and configured to reciprocate toward the axis on the other surface of the second housing, and a first cover configured to enclose the other surface of the first housing, the other surface of the second housing, and the other surface of the slide portion, wherein the flexible displays face each other in a folded state, and wherein the flexible displays do not face each other and form a plane in an unfolded state

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 4A, 4B, 4C, 4D, 4E and 4F illustrate a foldable electronic device accessory in an unfolded state according to an embodiment FIGS. 5A, 5B, 5C, 5D, 5E and 5F illustrate a foldable electronic device accessory in a folded state according to an embodiment;

FIGS. 10A, 10B, and 10C illustrate a process in which a foldable electronic device accessory is folded according to an embodiment;

DETAILED DESCRIPTION

The following description with reference to the accompanying drawings is provided to assist in a comprehensive understanding of embodiments of the disclosure. It includes various specific details to assist in that understanding, but these are to be regarded as examples. Accordingly, those of ordinary skill in the art will recognize that various changes and modifications of the embodiments described herein can be made without departing from the scope and spirit of the disclosure. In addition, descriptions of well-known functions and constructions may be omitted for the sake of clarity and conciseness.

Figure 1:
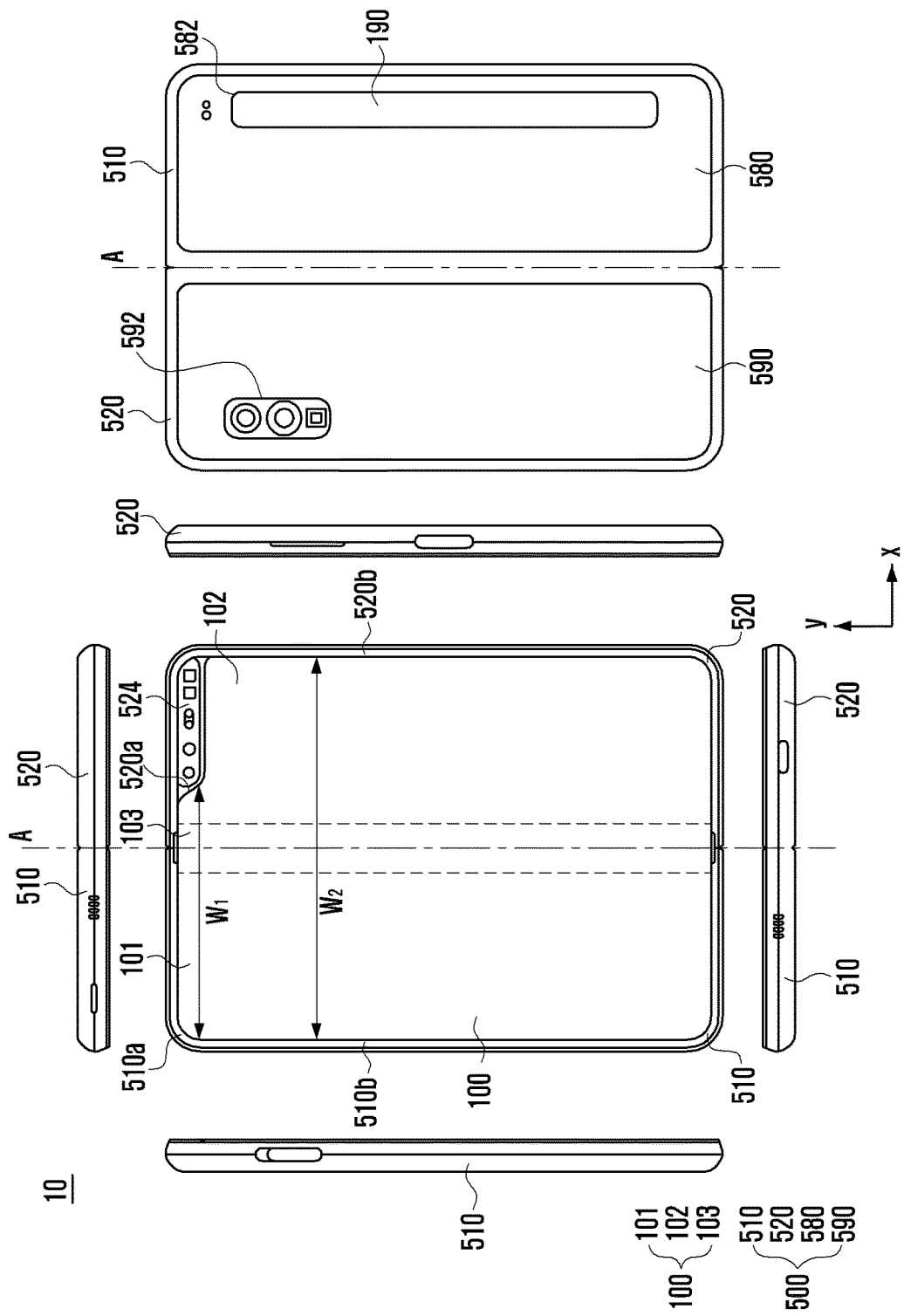
FIG. 1 illustrates an unfolded state of an electronic device according to an embodiment.

FIG. 1 illustrates an unfolded state of an electronic device according to an embodiment. Referring to FIG. 1, the electronic device 10 may include a foldable housing 500, a hinge cover 530 (see FIG. 2, described below) that covers a foldable portion of the foldable housing 500, and a flexible or foldable display 100 disposed in a space defined by the foldable housing 500. A surface on which the display 100 is disposed may be referred to as a first surface or a front surface of the electronic device 10, and the opposite surface of the front surface may be referred to as a second surface or a rear surface of the electronic device 10. A surface surrounding a space between the front and rear surfaces may be referred to as a third surface or a lateral surface of the electronic device 10.

The foldable housing 500 may include a first housing structure (e.g., a first housing) 510, a second housing structure (e.g., a second housing) 520 having a sensor area 524, a first rear cover 580, and a second rear cover 590. The foldable housing 500 is not limited to the shape and configuration shown in FIGS. 1 and 2, and may be implemented with any other suitable shape and configuration. For example, and without limitation, the first housing 510 and the first rear cover 580 may be integrally formed, and the second housing 520 and the second rear cover 590 may be integrally formed.

The first housing 510 and the second housing 520 are disposed at opposing sides (i.e., left and right sides) with respect to a folded axis (indicated by 'A'), and may have a generally symmetric shape with respect to the folding axis (A). As will be described in greater detail below, the first and second housings 510 and 520 may have different angles or distances therebetween, depending on whether the electronic device 10 is in a flat (e.g., unfolded) state, a folded state, or an intermediate state of being partly folded or unfolded. The second housing 520 has the sensor area 524 in which various sensors are disposed. Except for the provision of the sensor area 524, both housings may be substantially symmetrical in shape.

In FIG. 1, the first housing 510 and the second housing 520 may together include a recess for accommodating the display 100 therein. The recess may have two or more different widths ($W_1$, $W_2$) in a direction perpendicular to the folding axis (A) because of the sensor area 524.

For example, the recess may have a first width ($W_1$) between a first portion 510a of the first housing 510 parallel to the folding axis (A) and a first portion 520a of the second housing 520 formed at one edge of the sensor area 524, and a second width ($W_2$) between a second portion 510b of the first housing 510 parallel to the folding axis (A) and a second portion 520b of the second housing 520 not corresponding to the sensor area 524 and being parallel to the folding axis (A). In this example, the second width ($W_2$) may be greater than the first width ($W_1$). In other words, the first portion 510a of the first housing 510 and the first portion 520a of the second housing 520, which have asymmetrical shapes, define the first width ($W_1$) of the recess, whereas the second portion 510b of the first housing 510 and the second portion 520b of the second housing 520, which have symmetrical shapes, define the second width ($W_2$) of the recess. The first portion 520a and the second portion 520b of the second housing 520 may have different distances from the folding axis (A). The width of the recess is not limited to the illustrated example. That is, the recess may have a plurality of different widths depending on the shape of the sensor area 524 or asymmetrical shapes of the first and second housings 510 and 520.

At least a portion of the first and second housings 510 and 520 may comprise a metallic or non-metallic material having a selected rigidity value to support the display 100.

The sensor area 524 may occupy a certain region adjacent to one corner of the second housing 520. The arrangement, shape, and size of the sensor area 524 are not limited to the illustrated example. For example, the sensor area 524 may be disposed at any other corner of the second housing 520 or at any position between top and bottom corners. Components for performing various functions may be embedded in the electronic device 10 and exposed to the front surface of the electronic device 10 through the sensor area 524 or through one or more openings provided in the sensor area 524. Such components may include various types of sensors, which may include and without limitation, at least one of a front camera, a receiver, and a proximity sensor.

The first rear cover 580 is disposed on one side of the folding axis on the rear surface of the electronic device 10. The first rear cover 580 may have a substantially rectangular periphery surrounded by the first housing 510. Similarly, the second rear cover 590 is disposed on the other side of the folding axis on the rear surface of the electronic device 10, and a substantially rectangular periphery of the second rear cover 590 may be surrounded by the second housing 520.

The first rear cover 580 and the second rear cover 590 may have a substantially symmetrical shape with respect to the folding axis (A). This is not essential, however, and the electronic device 10 may include the first and second rear covers 580 and 590 having various shapes. The first rear cover 580 may be integrally formed with the first housing 510, and the second rear cover 590 may be integrally formed with the second housing 520.

The first rear cover 580, the second rear cover 590, the first housing 510, and the second housing 520 may together define a space in which various components of the electronic device 10 (e.g., a printed circuit board or a battery) are disposed. One or more components may be disposed near and visually exposed to the rear surface of the electronic device 10. For example, at least a portion of a sub display 190 may be visually exposed through a first rear area 582 of the first rear cover 580. One or more components or sensors may be visually exposed through a second rear area 592 of the second rear cover 590. Such sensors may include and without limitation, a proximity sensor and/or a rear camera.

Figure 2:
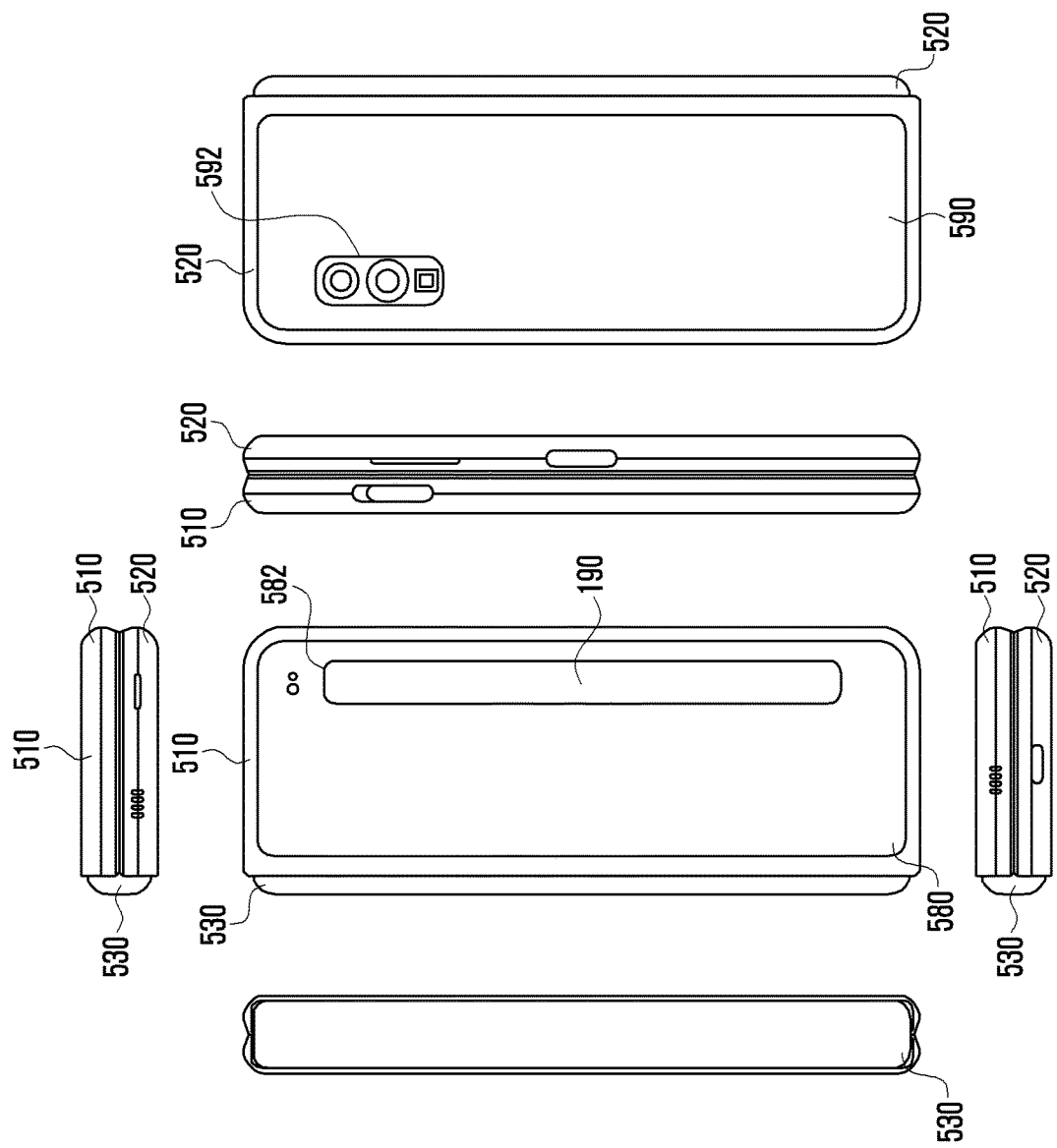
FIG. 2 illustrates a folded state of an electronic device according to an embodiment.

FIG. 2 illustrates a folded state of an electronic device according to an embodiment. Referring to FIG. 2, the hinge cover 530 is disposed between the first housing 510 and the second housing 520 and may be configured to cover an internal component (e.g., a hinge). In an embodiment, depending whether the electronic device 10 is in a flat state or in a folded state, the hinge cover 530 may be hidden by a part of the first and second housings 510 and 520 or exposed to the outside.

For example, when the electronic device 10 is in the flat state as shown in FIG. 1, the hinge cover 530 may be hidden by the first and second housings 510 and 520, thus being not exposed. When the electronic device 10 is in the folded state (e.g., a fully folded state) as shown in FIG. 2, the hinge cover 530 may be exposed to the outside between the first and second housings 510 and 520. In an intermediate state in which the first and second housings 510 and 520 are folded at a certain angle, the hinge cover 530 may be partially exposed to the outside between the first and second housings 510 and 520. The exposed area in the intermediate state may be smaller than that in the fully folded state. The hinge cover 530 may have a curved surface.

The display 100 may be disposed in the space defined by the foldable housing 500. For example, the display 100 may be mounted in the recess formed by the foldable housing 500 while forming most of the front surface of the electronic device 10.

Therefore, the front surface of the electronic device 10 may include the display 100, a portion of the first housing 510 adjacent to the display 100, and a portion of the second housing 520. In addition, the rear surface of the electronic device 10 may include the first rear cover 580, a portion of the first housing 510 adjacent to the first rear cover 580, the second rear cover 590, and a portion of the second housing 520 adjacent to the second rear cover 590.

The display 100 may enable at least a portion thereof to be deformed into a curved surface. As shown in FIG. 1, the display 100 may include a folding area 103, a first area 101 disposed on one side with respect to the folding area 103 (e.g., the left side of the folding area 103 shown in FIG. 1), and a second area 102 disposed on the other side with respect to the folding area 103 (e.g., the right side of the folding region 103 shown in FIG. 1).

The divided areas of the display 100 illustrated in FIG. 1 is an example only, and the display 100 may be divided into a plurality of areas according to the structure or function thereof. For example, instead of being divided into areas based on the folding area 103 or the folding axis (A) each parallel to the y-axis in FIG. 1, the display 100 may be divided into areas based on another folding area or folding axis (e.g., each parallel to the x-axis).

The first area 101 and the second area 102 may have a symmetrical shape with respect to the folding area 103. However, unlike the first area 101, the second area 102 may have a cut portion to expose the sensor area 524, resulting in an asymmetrical shape. Therefore, the first and second areas 101 and 102 may have a symmetrical portion and an asymmetrical portion.

In FIG. 1, when the electronic device 10 is in a flat state, the first housing 510 and the second housing 520 are disposed to form an angle of 180 degrees and face the same direction. Thus, the surfaces of the first and second areas 101 and 102 of the display 100 form an angle of 180 degrees with each other and face the same direction (e.g., the front direction of the electronic device). In addition, the folding area 103 may form the same plane as the first and second areas 101 and 102.

When the electronic device 10 is in a folded state in FIG. 2, the first housing 510 and the second housing 520 are disposed to face each other. Thus, the surfaces of the first and second areas 101 and 102 of the display 100 form a small angle (e.g., between 0 and 10 degrees) and face each other. In addition, the folding area 103 may be formed to have partially a curved surface having a certain curvature.

When the electronic device 10 is in an intermediate state, the first housing 510 and the second housing 520 are disposed to form a certain angle. Thus, the surfaces of the first and second areas 101 and 102 of the display 100 form a certain angle which is greater than the angle in the folded state and less than the angle in the flat state. In addition, the folding area 103 may be formed to have partially a curved surface having a certain curvature that is less than the curvature in the folded state.

Figure 3:
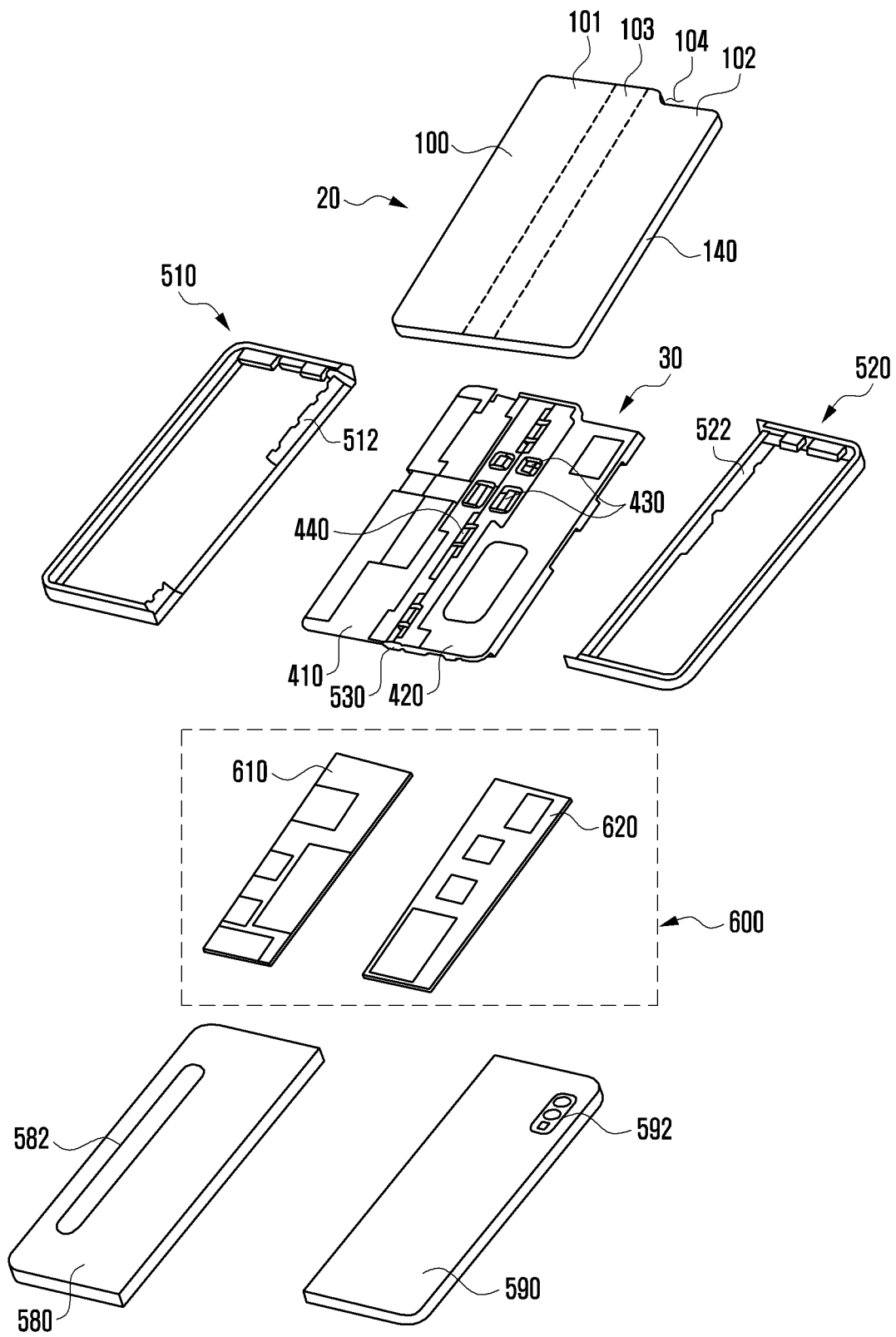
FIG. 3 is an exploded perspective view illustrating an electronic device according to an embodiment.

FIG. 3 is an exploded perspective view illustrating an example foldable electronic device according to an embodiment.

Referring to FIG. 3, the electronic device 10 may include a display unit including a display 20, a bracket assembly including a bracket 30, a substrate unit including a substrate 600, the first housing 510, the second housing 520, the first rear cover 580, and the second rear cover 590. The display unit 20 may be also referred to as a display module or a display assembly.

The display unit 20 may include the display 100 and at least one plate or layer 140 on which the display 100 is mounted. The plate 140 may be disposed between the display 100 and the bracket assembly 30. The display 100 may be disposed on at least a portion of one surface (e.g., the upper surface in FIG. 3) of the plate 140. The plate 140 may have a shape corresponding to the display 100. For example, a portion of the plate 140 may have a shape corresponding to a cut portion 104 of the display 100.

The bracket assembly 30 may include a first bracket 410, a second bracket 420, a hinge structure 440 including a hinge disposed between the first and second brackets 410 and 420, the hinge cover 530 covering the hinge structure, and a wiring member 430 (e.g., a flexible printed circuit (FPC)) intersecting with the first and second brackets 410 and 420.

The bracket assembly 30 may be disposed between the plate 140 and the substrate unit 600. For example, the first bracket 410 may be disposed between the first area 101 of the display 100 and a first substrate 610 of the substrate unit 600. The second bracket 420 may be disposed between the second area 102 of the display 100 and a second substrate 620 of the substrate unit 600.

The wiring member 430 and the hinge structure 440 may be disposed, at least in part, inside the bracket assembly 30. The wiring member 430 may be disposed in a direction (e.g., the x-axis direction) that crosses the first and second brackets 410 and 420. The wiring member 430 may be disposed in a direction perpendicular to a folding axis (e.g., the y-axis or the folding axis (A) in FIG. 1) of the folding area 103 of the electronic device 10.

As described above, the substrate unit 600 may include the first substrate 610 disposed to correspond to the first bracket 410, and the second substrate 620 disposed to correspond to the second bracket 420. The first and second substrates 610 and 620 may be disposed in a space formed by all or most of the bracket assembly 30, the first housing 510, the second housing 520, the first rear cover 580, and the second rear cover 590. On the first substrate 610 and the second substrate 620, electronic components for implementing various functions of the electronic device 10 may be mounted.

The first housing 510 and the second housing 520 may be assembled to be combined with both sides of the bracket assembly 30 when the display unit 20 is combined with the bracket assembly 30. As will be described below, the first housing 510 and the second housing 520 may be combined with the bracket assembly 30 by sliding on both sides of the bracket assembly 30.

The first housing 510 may have a first rotation supporting surface 512, and the second housing 520 may have a second rotation supporting surface 522 corresponding to the first rotation supporting surface 512. Each of the first and second rotation supporting surfaces 512 and 522 may have a curved surface corresponding to the curved surface included in the hinge cover 530.

When the electronic device 10 is in the flat state (e.g., FIG. 1), the first and second rotation supporting surfaces 512 and 522 cover the hinge cover 530 so that the hinge cover 530 may not be exposed or may be minimally exposed to the rear surface of the electronic device 10. When the electronic device 10 is in the folded state (e.g., FIG. 2), the first and second rotation supporting surfaces 512 and 522 rotate along the curved surfaces included in the hinge cover 530 so that the hinge cover 530 may be exposed to the rear surface of the electronic device 10.

FIGS. 4A, 4B, 4C, 4D, 4E and 4F illustrate a foldable electronic device accessory 700 in an unfolded state according to an embodiment. Specifically, FIG. 4A illustrates one surface 711 of a first housing 710 and one surface 731 of a second housing 730, FIG. 4B illustrates the other surface 713 of the first housing 710 and the other surface 733 of the second housing 730, FIG. 4C illustrates a left side view, FIG. 4D illustrates a right side view, FIG. 4E illustrates a top view, and FIG. 4F illustrates a bottom view.

When the foldable electronic device accessory 700 is in an unfolded state, the other surfaces of the first housing 710 and the second housing 730 face in the same direction, representing when the first housing 710 and the second housing 730 form a plane or flat surface.

In FIGS. 4A, 4B, 4E and 4F, the foldable electronic device accessory 700 may include a first housing 710, second housing 730, slide portion 740, and first cover 750.

In FIGS. 4A, 4B and 4D, the first housing 710 may be coupled to a first body of the foldable electronic device and may include a second housing structure 520 and a second area 102 (see FIG. 1) of a display 100 (see FIG. 3).

In FIGS. 4A and 4B, the second housing 730 may be seated in and coupled to a second body of the foldable electronic device, wherein the second body may include a first housing structure 510 and a first area 101 (FIG. 1) of the display 100 (FIG. 3). In FIG. 4A, at least one slide groove 735 may be formed in a direction perpendicular to an axis 720 in the second housing 730.

At least a portion of the second housing 730 in FIGS. 4A and 4B may be made of a transparent material, and a sub display 190 (FIG. 2), which is at least a portion of the foldable electronic device, may be visible through the portion. For example, the second housing 730 may be made of a transparent material, and a metal oxide such as aluminum or nickel may be deposited at the other surface of the second housing 730. The sub display 190 is not visible when the sub display 190 of the foldable electronic device is turned off. However, when the sub display 190 is turned on and there is a light source, the sub display 190 may be visible through at least a portion of the second housing 730.

In FIG. 4B, one surface of the slide portion 740 may be disposed to face the other surface 733 of the second housing 730, and the slide portion 740 may be formed to correspond to a length of a vertical direction of the second housing 730. The slide portion 740 may be formed less than a width of a lateral direction of the second housing 730 and may perform a reciprocating slide movement toward an axis 720. For example, the slide portion 740 may perform a reciprocating slide movement in a lateral direction in the second housing 730 in the state illustrated in FIG. 4B. At one surface 741 (FIG. 7) of the slide portion 740 illustrated in FIG. 4B, at least one slide protrusion 745 (FIG. 6A) may be formed to correspond to a position of the slide groove 735. As the slide protrusion 745 is inserted into the slide groove 735 and moves, the slide protrusion 745 may perform a reciprocating slide movement toward the axis 720 in FIGS. 4A and 4B.

The first cover 750 illustrated in FIGS. 4E and 4F may be coupled to the other surface 713 of the first housing 710 and the other surface 743 (FIG. 7) of the slide portion 740 and be formed to correspond to a size of the other surface 713 of the first housing 710 and the other surface 733 of the second housing 730 of an unfolded state. When a user grips the foldable electronic device accessory 700, the first cover 750 in FIGS. 4E and 4F may be a portion in direct contact with the user. For example, the first cover 750 may be made of a leather material to enable the user to experience a soft touch feeling.

FIGS. 5A, 5B, 5C, 5D, 5E and 5F illustrate a foldable electronic device accessory 700 in a folded state according to an embodiment. Specifically, FIG. 5A illustrates the second housing 730 overlapped and folded on the first housing 710, FIG. 5B illustrates a rear view of FIG. 5A, FIG. 5C illustrates a left side view, FIG. 5D illustrates a right side view, FIG. 5E illustrates a top view, and FIG. 5F illustrates a bottom view.

When the foldable electronic device accessory 700 is in a folded state, one surface of the first housing 710 and one surface of the second housing 730 are disposed to face each other.

In FIG. 5A, the first body and the second body of the foldable electronic device may be foldably connected to each other using an edge contacting each of these bodies as the axis 720. In FIG. 5D, the first housing 710 in FIG. 5B and the second housing 730 in FIG. 5A coupled to the first body and the second body, respectively, may be folded together without a structure for separate folding as the first body and the second body are folded and include a foldable structure such as a separate hinge structure. However, the first housing 710 and the second housing 730 may be folded and unfolded without a separate structure. For example, the first housing 710 and the second housing 730 may be connected by a flexible material.

In FIGS. 5A, 5E and 5F, as the foldable electronic device accessory 700 is folded, the slide portion 740 may perform a slide movement at the other surface 733 of the second housing 730. The slide portion 740 may move a predetermined distance from the right to the left in FIG. 5A, and a moving distance may correspond to a thickness when the first housing 710 and the second housing 730 are overlapped.

The first cover 750 in FIGS. 5C, 5E and 5F is coupled to the other surface 733 of the first housing 710 illustrated in FIG. 5A and the other surface 743 (FIG. 7) of the slide portion 740, but may not be directly coupled to the other surface 733 of the second housing 730. As the first cover 750 is not directly coupled to the other surface 733 of the second housing 730, when the foldable electronic device accessory 700 is in a folded state, the slide portion 740 may cover and protect a hinge portion 440 (FIG. 3) of the foldable electronic device while a sliding movement operates freely at the other surface 733 of the second housing 730.

In FIG. 5A, as the foldable electronic device accessory 700 is folded, the sub display 190 (FIG. 2) may be exposed through at least a portion 737 of the other surface 733 of the second housing 730 exposed by a movement of the slide portion 740.

Figure 6A:
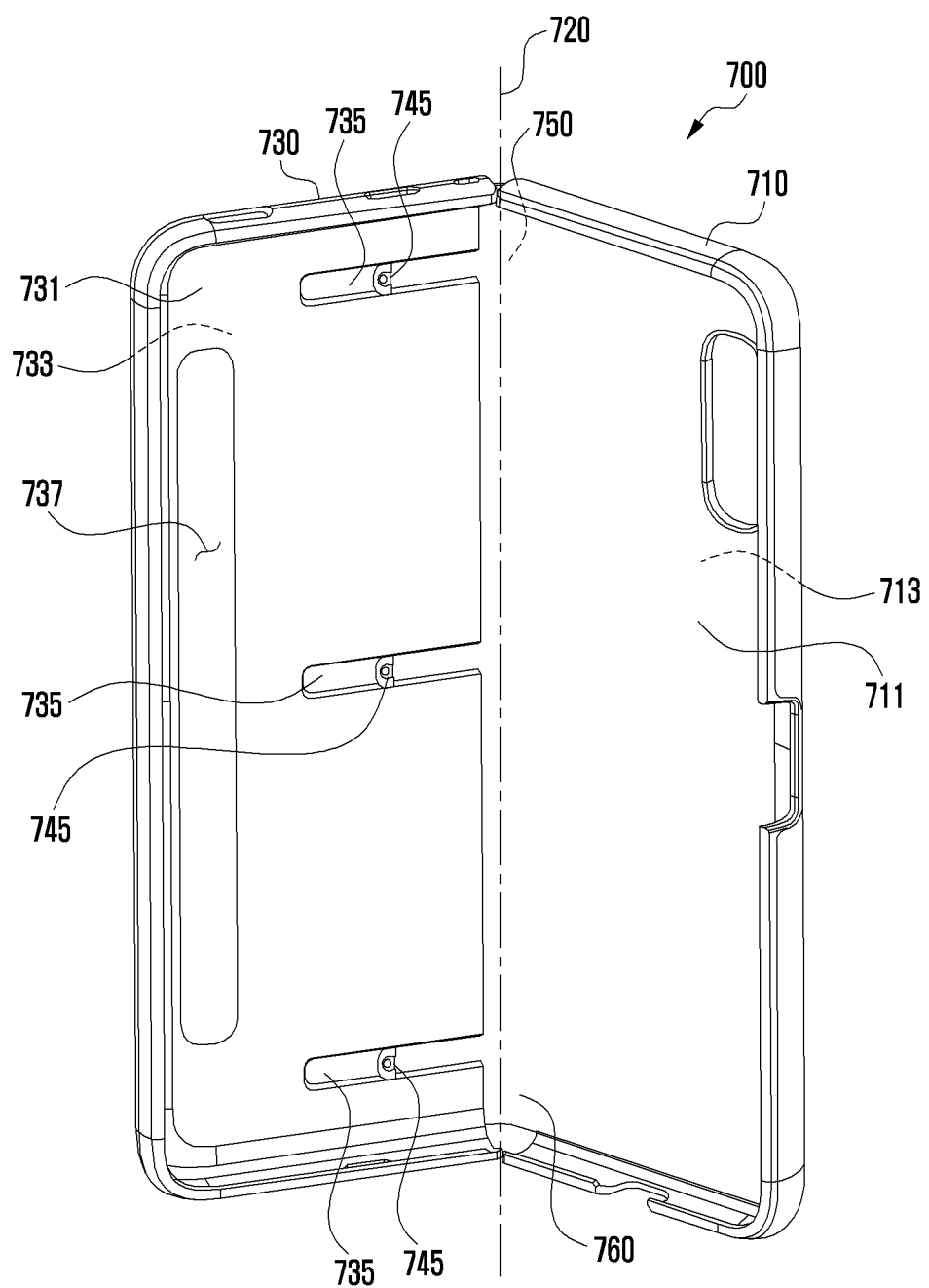
FIGS. 6A and 6B illustrate a foldable electronic device accessory according to an embodiment.
Figure 6B:
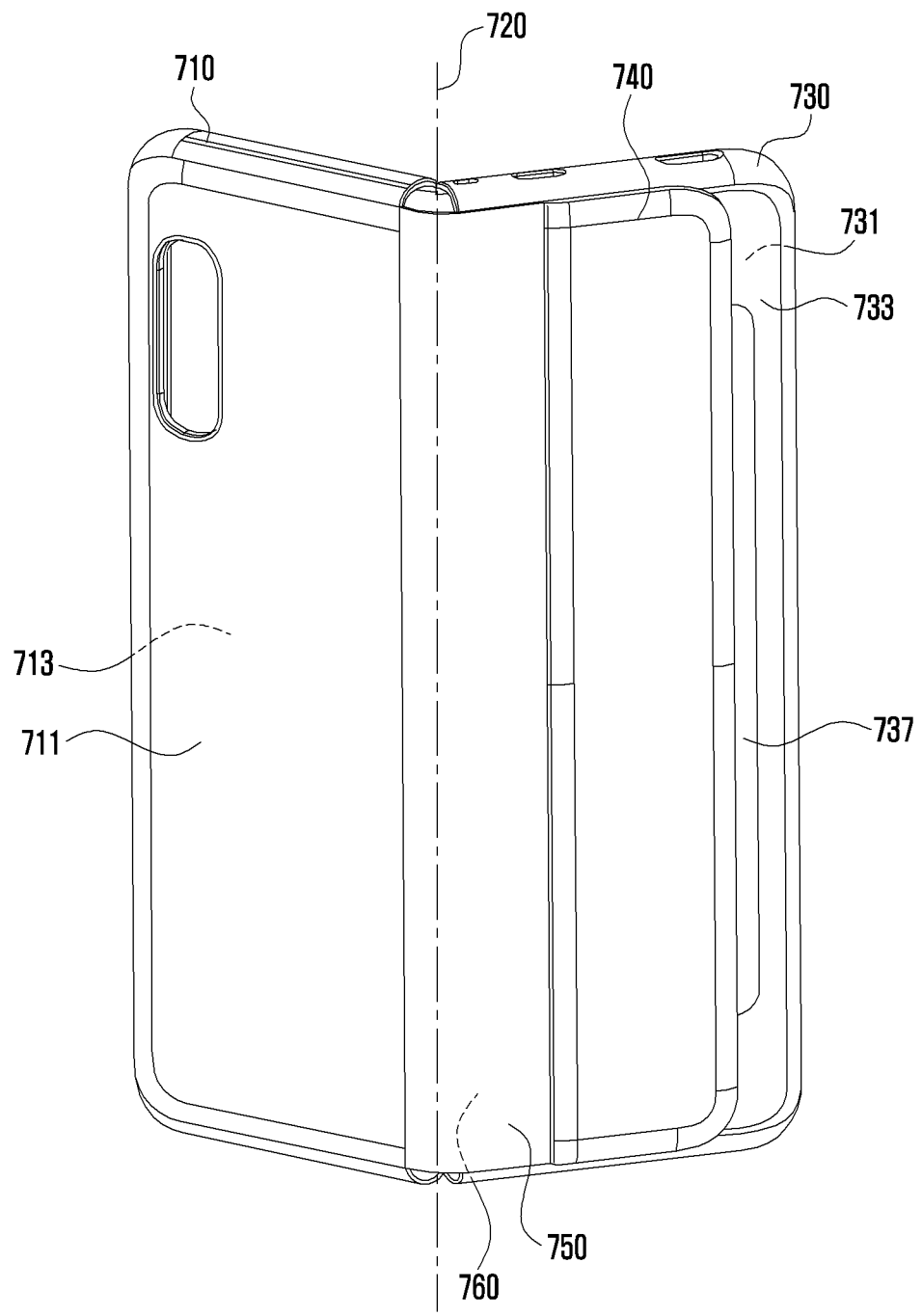

FIGS. 6A and 6B illustrate a foldable electronic device accessory 700 according to an embodiment.

FIG. 6A illustrates a surface 711 and a surface 731 of the foldable electronic device accessory 700.

The first housing 710 may be coupled to a first body of a foldable electronic device according to an embodiment of the disclosure, and the second housing 730 may be seated in and coupled to a second body of a foldable electronic device according to an embodiment of the disclosure. In the second housing 730, at least one slide groove 735 may be formed in a direction perpendicular to the axis 720, which is a reference for folding the first body and the second body of the foldable electronic device, and the foldable electronic device accessory 700 to be folded together according to folding of the foldable electronic device may share the axis 720.

At one surface 741 (FIG. 7) of the slide portion 740 according to the embodiment of the disclosure, at least one slide protrusion 745 may be formed to correspond to a position of the slide groove 735. As the slide protrusion 745 is inserted into the slide groove 735 and moves, the slide protrusion 745 may perform a reciprocating slide movement toward the axis 720. At least a portion 737 of the second housing 730 is made of a transparent material, and the sub display 190 (FIG. 2) of the foldable electronic device may be visible through the portion 737.

FIG. 6B is a view illustrating the other surfaces 713 and 733 of the foldable electronic device accessory 700 according to an embodiment. In FIG. 6B, the foldable electronic device accessory 700 may include a first housing 710, second housing 730, slide portion 740, and first cover 750.

In FIG. 6B, one surface 741 of the slide portion 740 may be disposed to face the other surface 733 of the second housing 730, and the slide portion 740 may be formed to correspond to a length of a vertical direction of the second housing 730. The slide portion 740 may be formed less than a width of a lateral direction of the second housing 730 and may perform a reciprocating slide movement toward the axis 720. A distance at which the slide portion 740 performs a reciprocating slide movement may correspond to a thickness when the first housing 710 and the second housing 730 are overlapped.

As the foldable electronic device accessory 700 is folded, the sub display 190 may be exposed through the other surface 733 of the second housing 730 exposed by a movement of the slide portion 740 to be visible to the user. The sub display 190 may be visible to the user through at least a portion 737 of the second housing 730. The second housing 730 may be made of a transparent material, and a metal oxide such as aluminum or nickel may be deposited at the other surface of the second housing 730. When the sub display 190 of the foldable electronic device is turned off, the sub display 190 is not visible. However, when the sub display 190 is turned on and there is a light source, the sub display 190 may be visible through at least a portion 737 of the second housing 730.

In FIGS. 6A and 6B, the first cover 750 may be formed to correspond to a size of the other surface 713 of the first housing 710 and the other surface 733 of the second housing 730 in an unfolded state. When the first cover 750 starts to be folded, the slide portion 740 may perform a sliding movement by a distance corresponding to the sum of thicknesses of the first housing 710 and the second housing 730; thus, a portion 737 of the other surface of the second housing 730 may be exposed.

The first cover 750 may be coupled to the other surface 713 of the first housing 710 and the other surface 743 (FIG. 7) of the slide portion 740 and may not be directly coupled to the other surface 733 of the second housing 730. The first cover 750 may be a portion in direct contact with the user. For example, the first cover 750 may be made of a leather material to enable a user to experience a soft touch feeling. The first cover 750 may be not directly coupled to the other surface 733 of the second housing 730. Thus, when the foldable electronic device accessory 700 is in a folded state, the slide portion 740 may be freely deformed while freely performing a sliding movement at the other surface 733 of the second housing 730 to cover and protect a hinge portion of the foldable electronic device.

Figure 7:
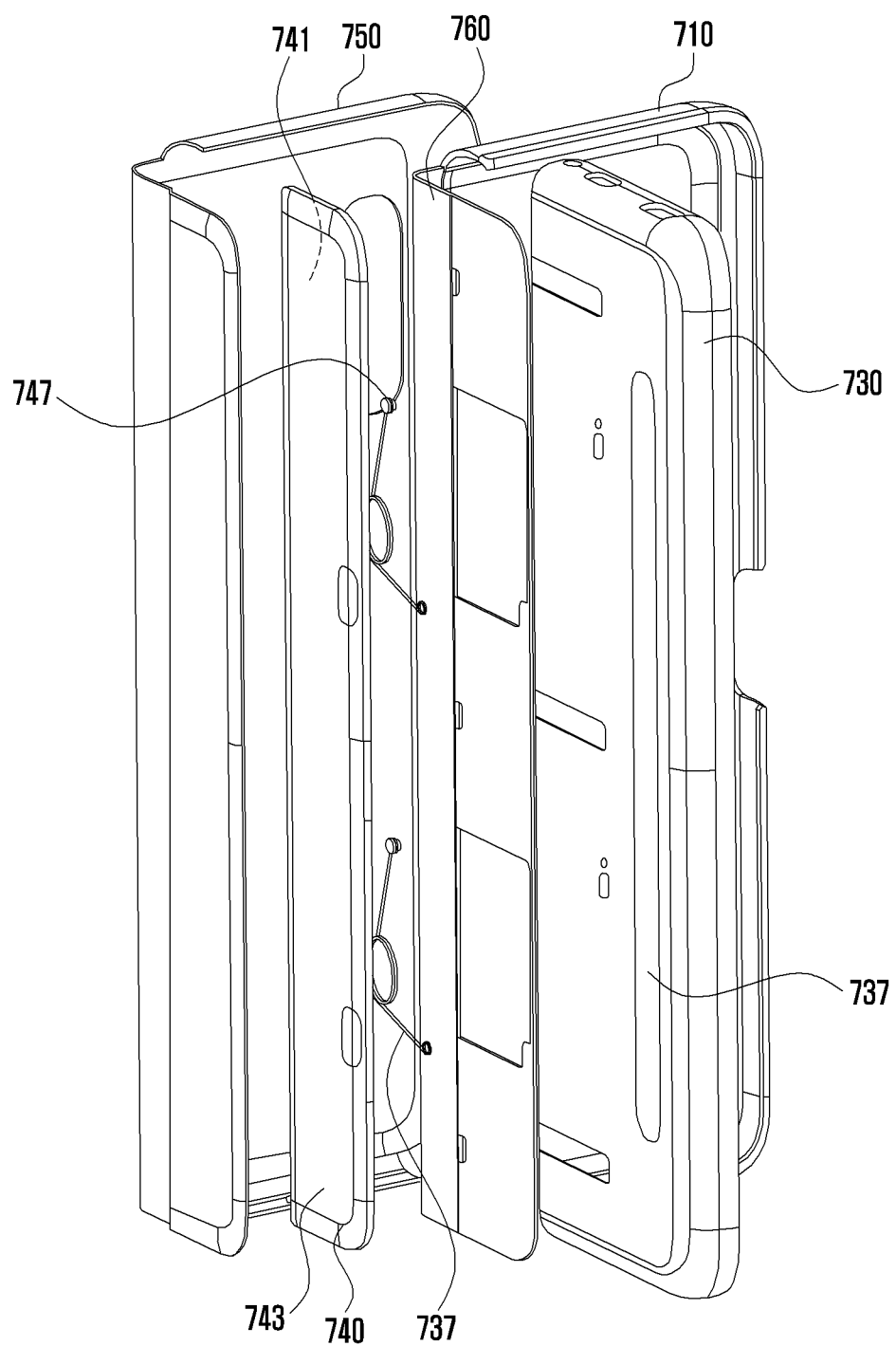
FIG. 7 is an exploded perspective view illustrating a foldable electronic device accessory according to an embodiment.

FIG. 7 is an exploded perspective view illustrating a foldable electronic device accessory 700 according to an embodiment.

As illustrated in FIG. 7, the foldable electronic device accessory 700 may further include an elastic body 747 and a second cover 760.

The elastic body 747 may be disposed at an elastic seating portion 749 (FIG. 8) formed at one surface of the slide portion 740. The elastic body 747 may be positioned at the other surface of the second housing 730 and one surface 741 of the slide portion 740. One side of the elastic body 747 may be connected to the second housing 730 and the other side of the elastic body 747 may be connected to the slide portion 740 to apply a force to the slide portion 740 in a direction away from the axis 720. Thus, a surface of the first cover 750 may maintain a taut state without being wrinkled. In particular, the first cover 750 may connect the first housing 710 and the second housing 730 and may be freely deformed during folding and unfolding, thus preventing a wrinkle from occurring at a surface of the first cover 750 using a force of the elastic body 747.

The second cover 760 may enclose and be coupled to one surface of the first housing 710 and may be extended to the other surface side of the second housing 730 to be coupled to one surface 741 of the slide portion 740. As with the first cover 750, the second cover 760 may not be directly coupled to the other surface of the second housing 730. The second cover 760 may be made of a soft material to protect a surface of the first body seated in the first housing 710 from being damaged and enable the slide portion 740 to freely slide. The second cover 760 may cover and protect a hinge portion of the foldable electronic device together with the first cover 750. The second cover 760 may be made of a chamois material.

Figure 8:
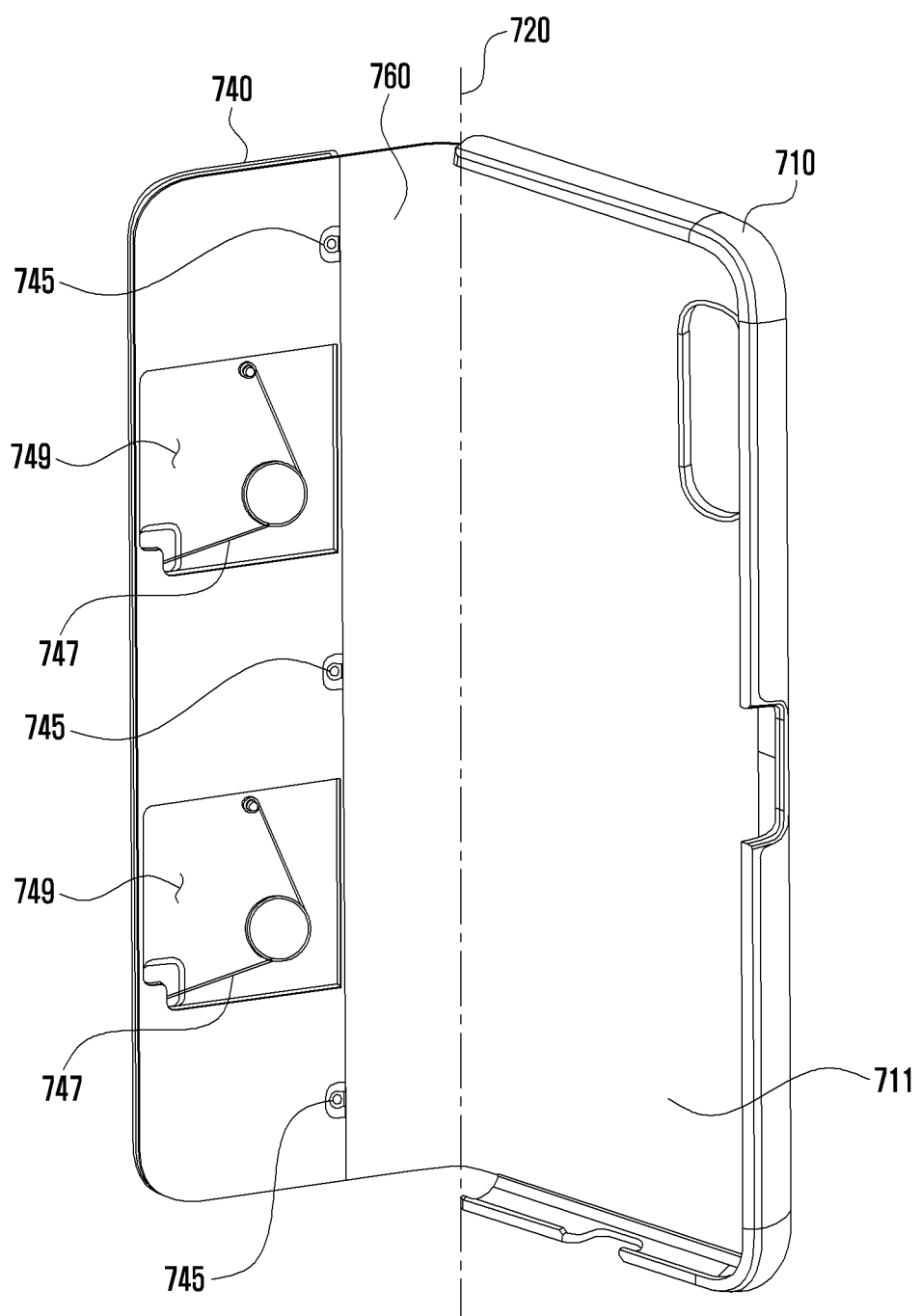
FIG. 8 illustrates a foldable electronic device accessory except for a second housing, according to an embodiment.

FIG. 8 illustrates a foldable electronic device accessory 700, except for a second housing 730 (FIG. 7) according to an embodiment.

In FIG. 8, at one surface of the slide portion 740, a portion may be recessed to form an elastic seating portion 749. In the slide portion 740, a slide protrusion 745 inserted into the slide groove 735 (FIG. 6A) to guide a movement path of the slide portion 740 may be formed. A plurality of slide protrusions 745 may be formed to correspond to the number of slide grooves 735. When the plurality of slide protrusions 745 is formed, the slide protrusions 745 may more stably guide a reciprocation of the slide portion 740.

One side of the elastic body 747 may be connected to the slide portion 740 and the other side of the elastic body 747 may be connected to the second housing 730. In FIG. 8, a torsion spring is illustrated as the elastic body 747, but the disclosure is not limited thereto, and various forms of elastic bodies 747 may be used.

The second cover 760 may enclose and be coupled to one surface 711 of the first housing 710 and may be extended toward the other surface 733 (FIG. 6B) of the second housing 730 to be coupled to one surface of the slide portion 740. In turn, an opening may be formed in the slide protrusion 745 to expose the slide protrusion 745.

Figures 9A, 9B:
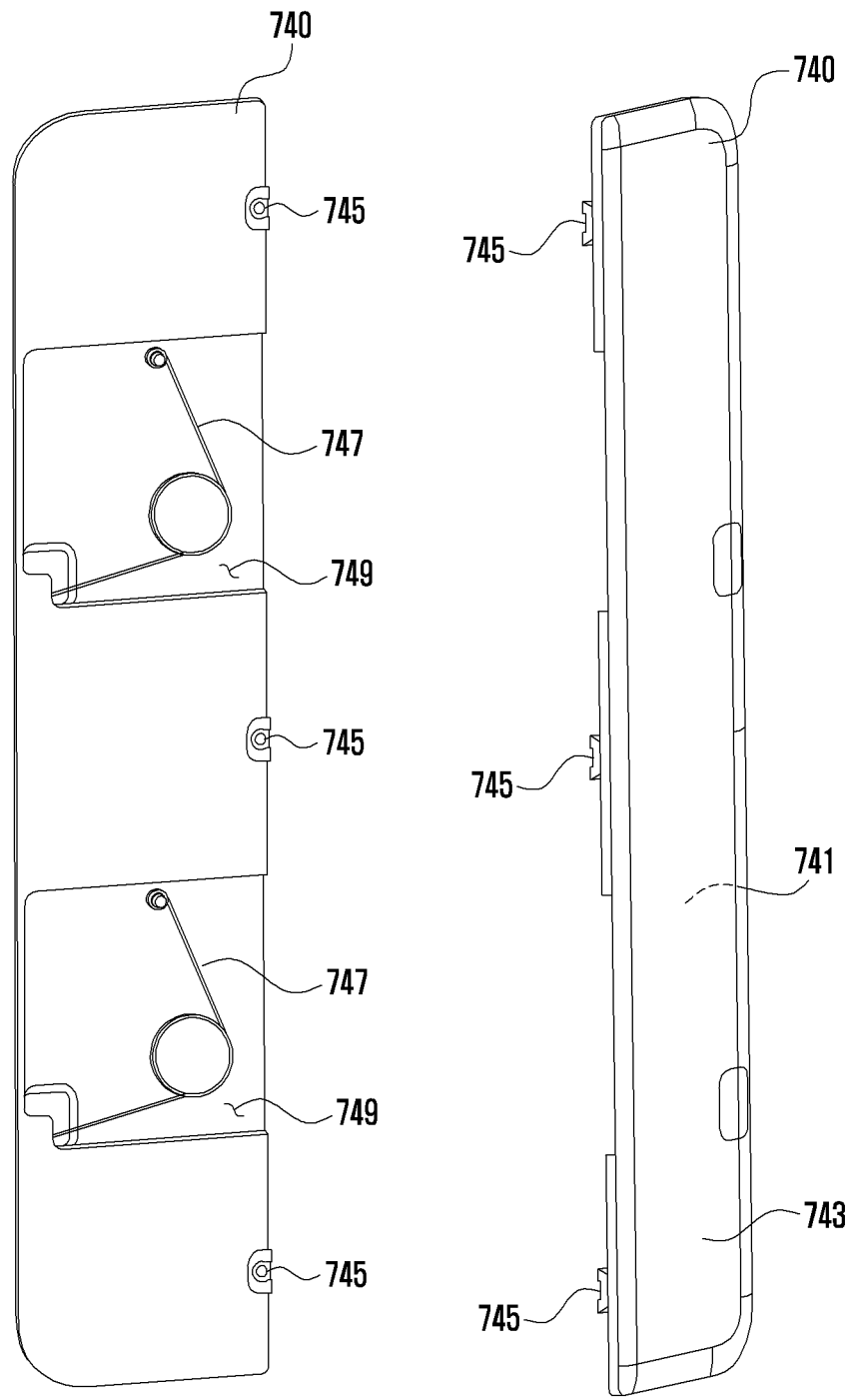
FIGS. 9A and 9B illustrate a slide portion according to an embodiment.

FIG. 9A illustrates one surface of a slide portion 740 according to an embodiment.

In FIG. 9A, at one surface 741 (FIG. 7) of the slide portion 740, a portion may be recessed to form an elastic seating portion 749. In the slide portion 740, a slide protrusion 745 inserted into the slide groove 735 (FIG. 6A) to guide the movement path of the slide portion 740 may be formed. A plurality of slide protrusions 745 may be formed to correspond to the number of slide grooves 735. In turn, the slide protrusions 745 may more stably guide a reciprocation of the slide portion 740.

One side of the elastic body 747 may be connected to the slide portion 740 and the other side of the elastic body 747 may be connected to the second housing 730. As in the embodiment of FIG. 8, in FIG. 9A, a torsion spring is illustrated as the elastic body 747, but the disclosure is not limited thereto. Various forms of elastic bodies 747 may be used.

FIG. 9B illustrates the other surface of the slide portion 740 according to an embodiment.

In FIG. 9B, at one surface 741 of the slide portion 740, a slide protrusion 745 may be formed, and may have a form that gradually widens as the slide protrusion 745 protrudes. For example, a cross-section of the slide protrusion 745 may have an inverted trapezoidal shape. When the slide protrusion 745 is inserted into the slide groove 735, the slide protrusion 745 may move along the slide groove 735 and may prevent the slide portion 740 from being separated from the second housing 730.

FIGS. 10A, 10B and 10C illustrate a process in which a foldable electronic device accessory 700 is folded according to an embodiment.

FIG. 10A illustrates a state in which a foldable electronic device accessory 700 is unfolded, and FIG. 10B illustrates a folding process.

When a process advances from the illustration of FIG. 10A to that of FIG. 10B, the slide portion 740 may move in a direction of the axis 720. Because a length of the first cover 750 is fixed, in a process in which the foldable electronic device accessory 700 is folded, the slide portion 740 may move by pulling in a direction of the axis 720 by a thickness of the first housing 710 and the second housing 730.

FIG. 10C illustrates a state in which folding is complete. When the movement of the slide portion 740 is complete, at least a portion 737 of the second housing 730 may be exposed, as illustrated in FIG. 10C, and the sub display 190 (FIG. 2) may be visible through the portion 737.

Figure 11A:
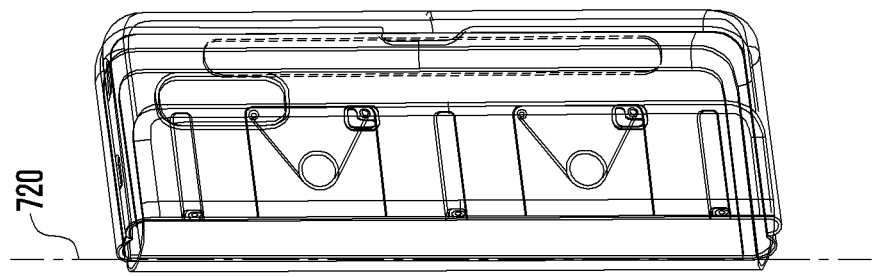
FIGS. 11A, 11B and 11C illustrate a slide groove, slide protrusion, and elastic body in a process in which a foldable electronic device accessory is folded according to an embodiment.
Figure 11B:
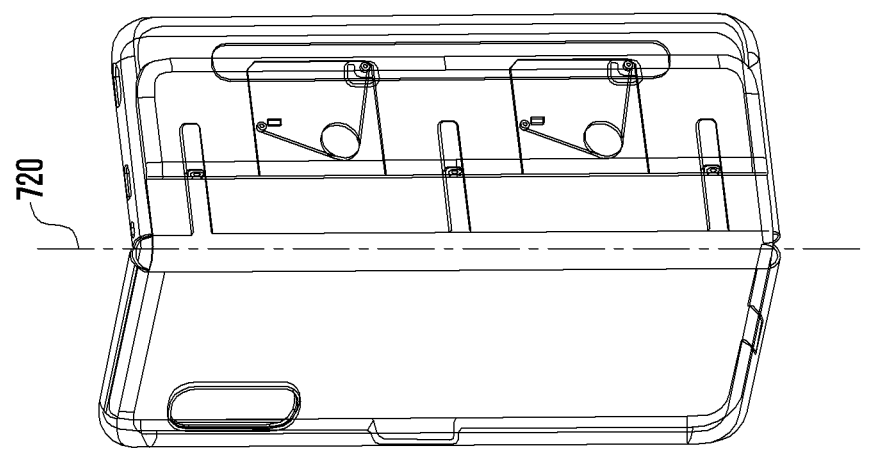
Figure 11C:
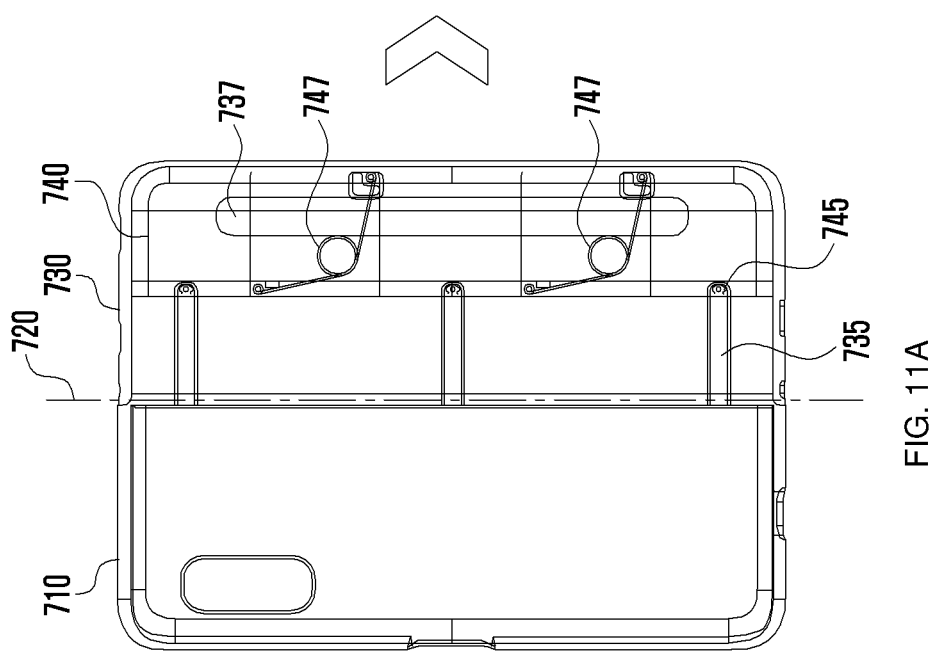

FIGS. 11A, 11B and 11C illustrate a slide groove 735, slide protrusion 745, and elastic body 747 in a process in which a foldable electronic device accessory 700 is folded according to an embodiment.

FIG. 11A illustrates a state in which a foldable electronic device accessory 700 is unfolded, and FIG. 11B illustrates a folding process.

When the process advances from the illustration of FIG. 11A to that of FIG. 11B, the slide portion 740 may compress an elastic body 747 while moving in a direction of the axis 720. As described above, because a length of the first cover 750 is fixed, in a folding process of the foldable electronic device, the slide portion 740 may move by pulling in a direction of the axis 720, which may be stored as elastic energy in the elastic body 747.

FIG. 11C illustrates a state in which folding is complete.

In the elastic body 747, one side is connected to the slide portion 740 and the other side is connected to the second housing 730, but the elastic body 747 applies an elastic force to the slide portion 740 in a direction away from the axis 720. Thus, the first cover 750 may maintain a taut state. For example, in an unfolding process advancing from the illustration of FIG. 11C to that of FIG. 11A, the elastic body 747 continuously applies an elastic force to the slide portion 740. Thus, the first cover 750 may be prevented from being sandwiched between the first housing 710 and the second housing 730 or the first cover 750 may be prevented from being wrinkled.

Figure 12C:
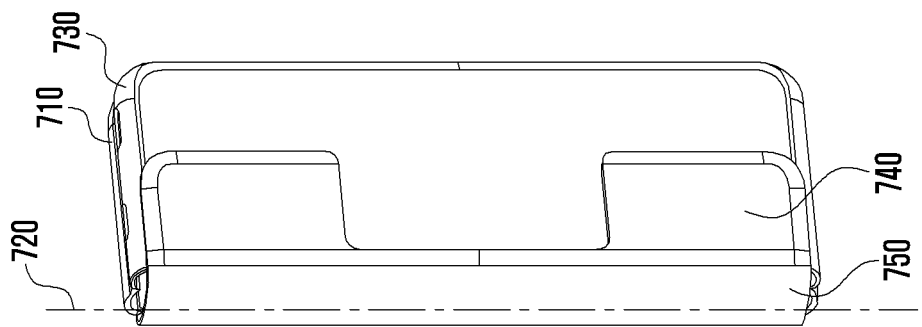
FIGS. 12A, 12B and 12C illustrate a process in which a foldable electronic device accessory is folded according to another embodiment.
Figure 12B:
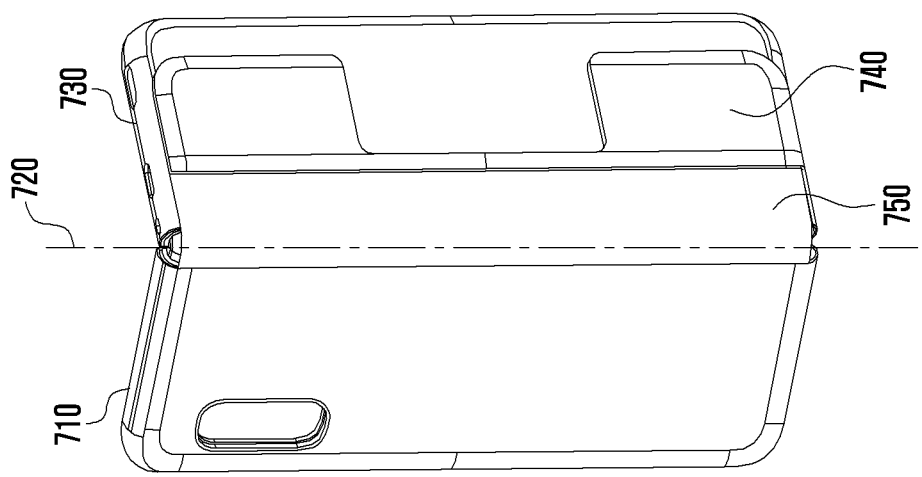
Figure 12A:
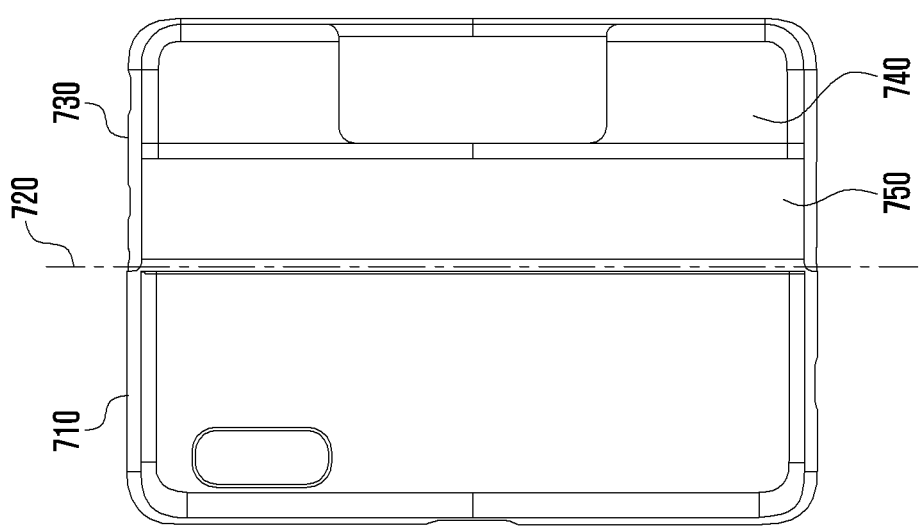

FIGS. 12A, 12B and 12C illustrate a process in which a foldable electronic device accessory 700 is folded according to another embodiment.

In the foldable electronic device accessory 700 in FIGS. 12A, 12B and 12C, a shape of the slide portion 740 may be changed according to a shape of a sub display of the foldable electronic device.

For example, when the foldable electronic device accessory 700 is for a foldable electronic device in which the sub display 190 (FIG. 2) of a line form is disposed, the foldable electronic device accessory 700 may be for a foldable electronic device in which a rectangular sub display is disposed.

In FIGS. 12A, 12B and 12C, the foldable electronic device accessory 700 includes a first housing 710 having one surface to which a first body of a foldable electronic device is coupled, a second housing 730 having one surface to which a second body foldably connected to the first body about the axis 720 is coupled, a slide portion 740 having one surface disposed to face the other surface of the second housing 730 and for reciprocating in a direction of the axis 720 on the other surface of the second housing 730, and a first cover 750 for enclosing the other surface of the first housing 710, the other surface of the second housing 730, and the other surface of the slide portion 740. In the folded state illustrated in FIG. 12C, one surface of the first housing 710 and one surface of the second housing 730 face each other, and in an unfolded state illustrated in FIG. 12A, the other surface of the first housing 710 and the other surface of the second housing 730 form a plane.

In the second housing 730, at least one slide groove 735 (FIG. 6A) may be formed in a direction perpendicular to the axis 720, and in the slide portion 740, at least one slide protrusion 745 (FIG. 6B) may be formed to correspond to a position of the slide groove 735, and the slide protrusion 745 may be inserted into the slide groove 735 to reciprocate in a direction in which the slide groove 735 is formed.

As described in embodiments herein, the foldable electronic device accessory 700 may further include an elastic body 747 positioned between the slide portion 740 and the other surface of the second housing 730 and having one side connected to the second housing 730 and the other side connected to the slide portion 740 and for applying a force to the slide portion 740 in a direction away from the axis 720.

At least a portion of the second housing 730 may be made of a transparent material, and a portion of the second body may be visible through at least a portion of the second housing 730.

When there is a light source at one surface side of the second housing 730, a portion of the second body may be visible through at least a portion of the second housing 730, and when there is no light source at one surface side of the second housing 730, the second body may not be visible.

When at least a portion of the second housing 730 is in an unfolded state, the slide portion 740 may be formed in a portion exposed by moving.

The first cover 750 may correspond to a size of the other surface of the first housing 710 and the other surface of the second housing 730 in the unfolded state.

The foldable electronic device accessory 700 may further include a second cover 760 enclosing and coupled to one surface of the first housing 710, extended to the other surface direction of the second housing 730, and coupled to one surface of the slide portion 740.

The second housing 730 may be made of a transparent material, and at the other surface of the second housing 730, a metal oxide may be formed by deposition.

The second housing 730 may be made of a transparent material, and at the other surface of the second housing 730, an opaque coating layer may be formed in the remaining portions, except for at least a portion of the second housing 730.

According to an embodiment, a foldable electronic device includes a first body, a second body foldably connected to the first body about a first axis, a flexible display disposed over the first body and the second body, a first housing having one surface to which the first body is coupled, a second housing having one surface to which a second body is coupled, a slide portion having one surface disposed to face the other surface of the second housing and reciprocating in a direction of the first axis on the other surface of the second housing, and a first cover for enclosing the other surface of the first housing, the other surface of the second housing, and the other surface of the slide portion, and in a folded state, the flexible displays face each other and in an unfolded state, the flexible displays form a plane.

In the second housing, at least one slide groove may be formed in a direction perpendicular to the first axis, and in the slide portion, at least one slide protrusion may be formed to correspond to a position of the slide groove, and the slide protrusion may be inserted into the slide groove to reciprocate in a direction in which the slide groove is formed.

The foldable electronic device may further include an elastic body positioned between the slide portion and the other surface of the second housing and having one side connected to the second housing, and the other side is connected to the slide portion and for applying a force to the slide portion in a direction away from the first axis.

At least a portion of the second housing may be made of a transparent material, and a portion of the second body may be visible through at least a portion of the second housing.

When there is a light source at one surface side of the second housing, a portion of the second body may be visible through at least a portion of the second housing, and when there is no light source at one surface side of the second housing, the second body may not be visible.

When at least a portion of the second housing is in an unfolded state, the slide portion may be formed in a portion exposed by moving.

The first cover may correspond to a size of the other surface of the first housing and the other surface of the second housing in an unfolded state.

The foldable electronic device may further include a second cover enclosing and coupled to one surface of the first housing and extended in the other surface direction of the second housing, and coupled to one surface of the slide portion.

The second housing may be made of a transparent material, and at the other surface of the second housing, a metal oxide may be formed by deposition.

The second housing may be made of a transparent material, and at the other surface of the second housing, in the remaining portions, except for at least a portion of the second housing, an opaque coating layer may be formed.

A foldable electronic device accessory can protect all exterior portions including a hinge portion of a foldable electronic device from scratches and external impacts.

Even if a foldable electronic device accessory is not separated from a foldable electronic device, a sub display can be exposed and used.

While the disclosure has been shown and described with reference to embodiments thereof, it will be understood by those skilled in the art that various changes in form and details may be made therein without departing from the sprit and scope of the disclosure as defined by the appended claims and their equivalents.

What is claimed is:

1. A foldable electronic device accessory, comprising:
a first housing having one surface configured to couple with at least a part of a first body of a foldable electronic device;
a second housing coupled to the first housing about an axis, wherein the second housing has one surface configured to couple with at least a part of a second body of the electronic device;
a slide portion having one surface disposed to face an other surface of the second housing and configured to reciprocate toward the axis on the other surface of the second housing; and
a first cover configured to enclose an other surface of the first housing, the other surface of the second housing, and an other surface of the slide portion,
wherein the one surface of the first housing and the one surface of the second housing face each other in a folded state, and
wherein the other surface of the first housing and the other surface of the second housing do not face each other and form a plane in an unfolded state;
wherein the second body of the electronic device is foldably connected to the first body of the electronic device.

2. The foldable electronic device accessory of claim 1,
wherein, in the second housing, at least one slide groove is formed in a direction perpendicular to the axis,
wherein, in the slide portion, at least one slide protrusion is formed to correspond to a position of the at least one slide groove, and
wherein the at least one slide protrusion is inserted into the at least one slide groove to reciprocate in a direction in which the at least one slide groove is formed.

3. The foldable electronic device accessory of claim 2, further comprising an elastic body positioned between the slide portion and the other surface of the second housing, the elastic body having one side connected to the second housing and another side connected to the slide portion and being configured to apply a force to the slide portion in a direction away from the axis.

4. The foldable electronic device accessory of claim 3,
wherein at least a portion of the second housing is made of a transparent material, and
wherein a portion of the second body is visible through at least a portion of the second housing.

5. The foldable electronic device accessory of claim 3,
wherein a portion of the second body is visible through at least a portion of the second housing when there is a light source at one surface of the second housing, and
wherein the second body is not visible when there is no light source at one surface of the second housing.

6. The foldable electronic device accessory of claim 5,
wherein at least a portion of the second housing is formed in an exposed portion as the slide portion moves when at least a portion of the second housing is in an unfolded state.

7. The foldable electronic device accessory of claim 6,
wherein the first cover corresponds to a size of the other surface of the first housing and the other surface of the second housing in the unfolded state.

8. The foldable electronic device accessory of claim 7, further comprising a second cover configured to enclose and be coupled to one surface of the first housing, and to be extended to the other surface of the second housing and be coupled to the one surface of the slide portion.

9. The foldable electronic device accessory of claim 5,
wherein the second housing is made of a transparent material and a metal oxide is deposited on the other surface of the second housing.

10. The foldable electronic device accessory of claim 4,
wherein the second housing is made of a transparent material, and
wherein an opaque coating layer is formed on all portions of the other surface of the second housing except for at least a portion of the second housing.

11. A foldable electronic device, comprising:
a first body;
a second body foldably connected to the first body about an axis;
a first flexible display disposed over the first body;
a second flexible display disposed over the second body;
a first housing having one surface to which the first body is coupled;
a second housing having one surface to which the second body is coupled;
a slide portion having one surface disposed to face an other surface of the second housing and configured to reciprocate toward the axis on the other surface of the second housing; and
a first cover configured to enclose an other surface of the first housing, the other surface of the second housing, and an other surface of the slide portion,
wherein the first flexible display faces the second flexible display in a folded state, and
wherein the first flexible display does not face the second flexible display and form a plane in an unfolded state.

12. The foldable electronic device of claim 11,
wherein, in the second housing, at least one slide groove is formed in a direction perpendicular to the axis,
wherein, in the slide portion, at least one slide protrusion is formed to correspond to a position of the at least one slide groove, and
wherein the at least one slide protrusion is inserted into the at least one slide groove to reciprocate in a direction in which the at least one slide groove is formed.

13. The foldable electronic device of claim 12, further comprising an elastic body positioned between the slide portion and the other surface of the second housing, the elastic body having one side connected to the second housing and another side connected to the slide portion and being configured to apply a force to the slide portion in a direction away from the axis.

14. The foldable electronic device of claim 13,
wherein at least a portion of the second housing is made of a transparent material and a portion of the second body is visible through at least a portion of the second housing.

15. The foldable electronic device of claim 13,
wherein a portion of the second body is visible through at least a portion of the second housing when there is a light source at one surface of the second housing, and
wherein the second body is not visible when there is no light source at one surface of the second housing.

16. The foldable electronic device of claim 15,
wherein at least a portion of the second housing is formed in an exposed portion as the slide portion moves when at least a portion of the second housing is in an unfolded state.

17. The foldable electronic device of claim 16,
wherein the first cover corresponds to a size of the other surface of the first housing and the other surface of the second housing in the unfolded state.

18. The foldable electronic device of claim 17, further comprising a second cover configured to enclose and be coupled to one surface of the first housing, and to be extended to the other surface of the second housing and be coupled to one surface of the slide portion.

19. The foldable electronic device of claim 15,
wherein the second housing is made of a transparent material and a metal oxide is deposited on the other surface of the second housing.

20. A foldable electronic device accessory comprising:
a first housing having one surface configured to couple with at least a part of a first body of a foldable electronic device;
a second housing coupled to the first housing about an axis, wherein the second housing has one surface configured to couple with at least a part of a second body of the electronic device;
a first cover configured to enclose an other surface of the first housing, and an other surface of the second housing,
wherein the one surface of the first housing and the one surface of the second housing face each other in a folded state,
wherein a portion of the second body is visible through at least a portion of the second housing when there is a light source at one surface of the second housing, and
wherein the second body is not visible when there is no light source at one surface
wherein the second housing is made of a transparent material, and
of the second housing.

\* \* \* \* \*